(12) United States Patent
Wright et al.

(10) Patent No.: US 11,735,045 B2
(45) Date of Patent: Aug. 22, 2023

(54) SYSTEMS AND METHODS FOR COMPUTATIONAL RESOURCE ALLOCATION FOR AUTONOMOUS VEHICLES

(71) Applicant: UATC, LLC, San Francisco, CA (US)

(72) Inventors: Nigel Wright, San Francisco, CA (US); Kailash Sethuraman, San Francisco, CA (US)

(73) Assignee: UATC, LLC, Mountain View, CA (US)

( * ) Notice: Subject to any disclaimer, the term of this patent is extended or adjusted under 35 U.S.C. 154(b) by 511 days.

(21) Appl. No.: 16/711,595

(22) Filed: Dec. 12, 2019

(65) Prior Publication Data
US 2021/0174678 A1    Jun. 10, 2021

Related U.S. Application Data

(60) Provisional application No. 62/943,543, filed on Dec. 4, 2019.

(51) Int. Cl.
*G06Q 30/00*    (2023.01)
*G08G 1/0968*    (2006.01)
(Continued)

(52) U.S. Cl.
CPC ....... *G08G 1/096838* (2013.01); *G06F 3/067* (2013.01); *G06Q 30/0207* (2013.01); *G06Q 30/0226* (2013.01); *G08G 1/096883* (2013.01)

(58) Field of Classification Search
CPC ........... G06Q 30/0207; G06Q 30/0226; G06Q 30/02; G06F 3/067; G06F 11/3006; G06G 1/096883; G06G 1/096838
See application file for complete search history.

(56) References Cited

U.S. PATENT DOCUMENTS 8,996,234 B1 * 3/2015 Tamari .................. B60W 40/09
                                                                                           701/123
10,145,691 B2 * 12/2018 Lynch .................... G01C 21/34
(Continued)

OTHER PUBLICATIONS

A. Taha and N. AbuAli, "Route Planning Considerations for Autonomous Vehicles," in IEEE Communications Magazine, vol. 56, No. 10, pp. 78-84, Oct. 2018, doi: 10.1109/MCOM.2018.1800135. (Year: 2018).*

(Continued)

*Primary Examiner* — Radu Andrei
(74) *Attorney, Agent, or Firm* — Dority & Manning, P.A.

(57) ABSTRACT

Systems and methods are directed to allocating unused or otherwise under-utilized computing resources of autonomous vehicles. In one example, a computer-implemented method obtaining, by a computing system, data describing a computational status of each autonomous vehicle of one or more autonomous vehicles describing a current or forecasted computational load. The method includes determining, by the computing system, an amount of excess computational capacity of each autonomous vehicle of the one or more autonomous vehicles, the amount of excess computational capacity for each autonomous vehicle of the one or more autonomous vehicles based at least in part on the computational status of the autonomous vehicle and a total computational capacity of the autonomous vehicle. The method includes allocating, by the computing system, at least a portion of the amount of excess computational capacity of each autonomous vehicle to processing operations associated with participation in a distributed ledger.

20 Claims, 11 Drawing Sheets

(51) Int. Cl.
*G06Q 30/0207* (2023.01)
*G06Q 30/0226* (2023.01)
*G06F 3/06* (2006.01)

(56) References Cited

U.S. PATENT DOCUMENTS

| | | | | |
|---|---|---|---|---|
| 2004/0088414 | A1* | 5/2004 | Flynn | G06F 9/5044 709/201 |
| 2008/0319645 | A1* | 12/2008 | Kumagai | G08G 1/01 701/533 |
| 2010/0153004 | A1* | 6/2010 | Natsume | G08G 1/096883 701/533 |
| 2011/0264366 | A1* | 10/2011 | Cabral | G01C 21/3415 701/533 |
| 2013/0041548 | A1* | 2/2013 | Krautter | G08G 1/166 701/25 |
| 2015/0160025 | A1* | 6/2015 | Konig | G08G 1/096827 701/410 |
| 2018/0067495 | A1* | 3/2018 | Oder | G05D 1/0255 |
| 2018/0067966 | A1* | 3/2018 | Oder | G05D 1/0276 |
| 2018/0143646 | A1* | 5/2018 | Suk | G06V 10/96 |
| 2018/0374014 | A1* | 12/2018 | Matsui | G06Q 50/30 |
| 2019/0049257 | A1* | 2/2019 | Westover | G01C 21/28 |
| 2019/0113353 | A1* | 4/2019 | Shimizu | B60W 50/082 |
| 2019/0301885 | A1* | 10/2019 | Lohmann | G01C 21/3641 |
| 2020/0128066 | A1* | 4/2020 | Sugimoto | G06F 9/5027 |
| 2020/0142757 | A1* | 5/2020 | Norris | G06F 9/542 |
| 2020/0200552 | A1* | 6/2020 | Sood | G01C 21/3461 |
| 2020/0209010 | A1* | 7/2020 | Beaurepaire | G08G 1/143 |
| 2020/0284599 | A1* | 9/2020 | Cyr | G01C 21/3469 |
| 2021/0114472 | A1* | 4/2021 | Stephens | B60L 53/64 |
| 2021/0239476 | A1* | 8/2021 | Duym | G05D 1/0217 |

OTHER PUBLICATIONS

Kovalenko; Robust Resource Allocation for Vehicle to Infrastructure (V2I) Networks; 2019 IEEE; 6 pages; 2019.*

Xin; Depressurize the Intelligent Vehicles Onboard Computational Power; Central South University; 6 pages; 2017.*

* cited by examiner

SYSTEMS AND METHODS FOR COMPUTATIONAL RESOURCE ALLOCATION FOR AUTONOMOUS VEHICLES

PRIORITY CLAIM

The present application is based on and claims benefit of U.S. Provisional Application 62/943,543 having a filing date of Dec. 4, 2019, which is incorporated by reference herein.

FIELD

The present disclosure relates generally to allocating unused or under-utilized computational resources in autonomous vehicles. More particularly, the present disclosure relates to systems and methods that allocate excess computational capacity associated with current or forecasted autonomous vehicle routes towards processing operations for participation in a distributed ledger.

BACKGROUND

The implementation of autonomous vehicle navigation and control systems requires a significant amount of highly specialized and expensive computational resources to handle worst-case data processing scenarios. For example, an autonomous vehicle system may have many high-power computational resources (e.g., specialized processors, hardware accelerators, and/or the like) which are used to process a large volume of sensor data (e.g., image data, LIDAR data, etc.) in order to comprehend and navigate the autonomous vehicle through a surrounding environment.

However, in less computationally complex situations, these resources often go unused or under-utilized. For example, certain driving scenarios require only a fraction of the total computational abilities of the autonomous vehicle system.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for variably allocating autonomous vehicle compute power. The method includes obtaining, by a computing system comprising one or more computing devices, data describing a computational status of each autonomous vehicle of one or more autonomous vehicles, the computational status describing a current or forecasted computational load. The method further includes determining, by the computing system, an entity-type of the autonomous vehicle. The method further includes determining, by the computing system, an amount of excess computational capacity of each autonomous vehicle of the one or more autonomous vehicles, the amount of excess computational capacity for each autonomous vehicle of the one or more autonomous vehicles based at least in part on the computational status of the autonomous vehicle and a total computational capacity of the autonomous vehicle. The method further includes allocating, by the computing system, at least a portion of the amount of excess computational capacity of each autonomous vehicle of the one or more autonomous vehicles to processing operations associated with participation in a distributed ledger.

Another example aspect of the present disclosure is directed to a computing system. The computing system includes one or more processors and one or more memories including instructions that, when executed by the one or more processors, cause the one or more processors to perform operations. The operations include obtaining data describing a computational status of each autonomous vehicle of one or more autonomous vehicles, the computational status describing a current or forecasted computational load. The operations further include determining an amount of excess computational capacity of each autonomous vehicle of the one or more autonomous vehicles, the amount of excess computational capacity for each autonomous vehicle of the one or more autonomous vehicles based at least in part on the computational status of the autonomous vehicle and a total computational capacity of the autonomous vehicle. The operations further include allocating at least a portion of the amount of excess computational capacity of each autonomous vehicle of the one or more autonomous vehicles to processing operations associated with participation in a distributed ledger.

Another example aspect of the present disclosure is directed to one or more tangible, non-transitory computer readable media. The one or more tangible, non-transitory computer readable media store computer-readable instructions, that when executed by one or more processors, cause the one or more processors to perform operations. The operations include obtaining data describing a computational status of each autonomous vehicle of one or more autonomous vehicles, the computational status describing a current or forecasted computational load. The operations further include determining an amount of excess computational capacity of each autonomous vehicle of the one or more autonomous vehicles, the amount of excess computational capacity for each autonomous vehicle of the one or more autonomous vehicles based at least in part on the computational status of the autonomous vehicle and a total computational capacity of the autonomous vehicle. The operations further include allocating at least a portion of the amount of excess computational capacity of each autonomous vehicle of the one or more autonomous vehicles to processing operations associated with participation in a distributed ledger.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
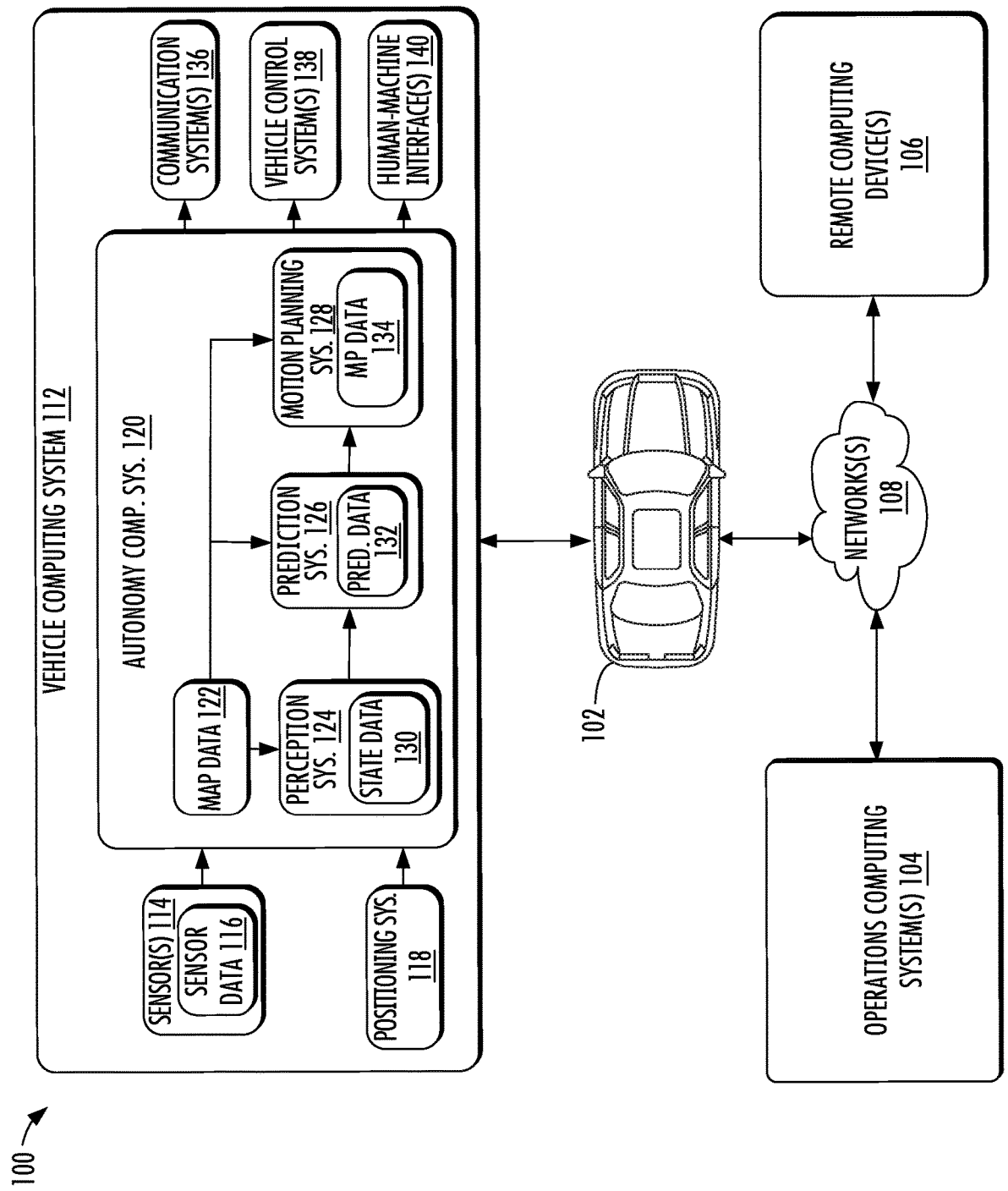
FIG. 1 depicts a block diagram of an example system for controlling the computational functions of an autonomous vehicle according to example embodiments of the present disclosure.

Example aspects of the present disclosure are directed to allocating unused or under-utilized computational resources in autonomous vehicles. In particular, according to one aspect of the present disclosure, the example systems and methods described herein allocate excess computational capacity associated with current or forecasted autonomous vehicle routes towards processing operations for participation in a distributed ledger. Thus, as an example, the present disclosure provides a method to allocate computational resources that would otherwise be unused in a plurality of autonomous vehicles towards performing hash operations associated with a cryptographic blockchain, allowing autonomous vehicle owners and service providers to generate significant additional value and optimize usage of available computational resources.

According to another aspect of the present disclosure, example systems and methods described herein can determine the computational complexity associated with a particular navigational route. The computing system can directly select alternative routes and/or enable users to select alternative routes which are less computationally complex, so that more computational resources can be directed to distributed ledger participation. The value gained from this distributed ledger participation can optionally be passed back to users and/or can be used to facilitate other user benefits. Thus, the present disclosure provides improved allocation of on-board autonomous vehicle computing resources, which may be used, for example, to perform processing operations associated with participating in a distributed ledger, thereby enabling autonomous vehicle service providers to fully utilize the available computational resources of their respective autonomous vehicles and reduce route costs for users.

More particularly, the implementation of data processing in autonomous vehicles requires significant and specialized on-board computational resources (e.g., graphics processing units, specialized hardware accelerators, etc.). These on-board computational resources must possess a computational capacity sufficient to process data in the most data-rich circumstances that an autonomous vehicle may encounter. As an example, certain driving operations (e.g., navigating a left turn in a crowded urban environment, etc.) require an autonomous vehicle computing system to rapidly process significant amounts of complex data. However, less complex circumstances (e.g., maintaining lane position on a lightly populated freeway, etc.) only require a fraction of this computational capacity. As a result, expensive computational resources capable of providing value to autonomous vehicle owners and service providers often go unused or otherwise under-utilized, even during performance of autonomous driving operations.

In response to this problem, the present disclosure proposes allocating unused computational capacity towards distributed computing tasks (e.g., distributed ledger processing), allowing autonomous vehicle owners and service providers to generate value from previously under-utilized computational resources. Towards this goal, the present disclosure provides a method to calculate the computational complexity required for navigating a base route and other alternative routes, allowing both autonomous vehicle transportation providers and/or rideshare users the opportunity to select routes based on computational complexity. As an example, a user receiving transportation services via an autonomous vehicle can choose to select a less computationally complex route in return for a portion of the value gained from the allocation of those resources towards another computing task.

More particularly, a computational status can be obtained that describes the current or forecasted computational load for autonomous vehicles. In some implementations, the current or forecasted computational load for an autonomous vehicle is based on the complexity of a route the autonomous vehicle is currently navigating or is forecasted to navigate. As an example, a route taken through a dense urban environment may be significantly more complex than navigating a rural backroad, and therefore may have a higher forecasted computational load. In some implementations, the complexity associated with navigating a route can be based, at least in part, on the driving maneuvers (e.g., turns, roundabout navigation, intersection navigation, lane changes, etc.) performed in the route. As an example, performing a left turn maneuver is generally considered to be more computationally complex than performing a right turn maneuver. Accordingly, two routes that navigate to the same destination using different maneuvers may possess significantly different computational complexities. Other factors, such as visibility, light conditions, weather conditions, etc., can further affect the computational load associated with navigating a route.

It should be noted that, although land-based navigation is utilized generally to illustrate the example embodiments, any type of autonomous vehicle can be used in accordance with the example embodiments. As an example, an airborne autonomous vehicle can navigate routes with associated computational complexities (e.g., routes with more or less air traffic, routes with ground-based obstacles, etc.). As another example, water-based autonomous vehicles can navigate routes with associated computational complexities (routes with more or less water transparency, routes with more or less water-based vehicle traffic, etc.). As such, any sort or type of autonomous vehicle may be utilized in the example embodiments.

A current or forecasted amount of excess computational capacity can be determined for autonomous vehicles. In some implementations, the amount of excess computational capacity can be based on the current or forecasted computational load and the total computational capacity of the autonomous vehicles. The total computational capacity of an autonomous vehicle can be based at least in part on the computational resources (e.g., graphics processing units, specialized hardware accelerators, other integrated circuits, etc.) on-board the vehicle. As an example, a first type of autonomous vehicle with a relatively small total computational capacity may not produce any excess computational capacity while navigating a certain route, while a second type of autonomous vehicle with a relatively large total computational capacity may produce significant excess computational capacity navigating the same route. It should be noted that, in some implementations, the amount of excess computational capacity can be determined assuming a worst-case data-processing situation associated with navigating the route. As such, the autonomous vehicles will never possess less computational capacity than is required to implement autonomous driving, therefore ensuring that the safety of passengers is never compromised.

In some implementations, multiple potential routes can be generated with different forecasted computational loads. A base route can be generated with a base route complexity primarily focused on arriving at a destination in an optimal amount of time. One or more alternative routes can also be generated, each with an associated complexity that is less complex than the base route. Route complexity can be assessed using historical data (e.g., data describing historical usage of computational resources along the route); as a function of driving maneuvers included in the route; and/or based on map data that provides, for given locations, a computational complexity of navigating at such location. As an example, a base route can be determined that uses a relatively high number of computationally complex driving maneuvers but arrives at a target destination in the most optimal amount of time. One or more alternative routes can be determined that use a relatively lower number of computationally complex driving maneuvers but arrive at a target destination in a less optimal amount of time. As another example, a base route can be determined that navigates through a computationally complex geographic area but arrives at a target destination in the most optimal amount of time. One or more alternative routes can be determined that can navigate through a less computationally complex area but arrive at a target destination in a less optimal amount of time. Utilizing different driving maneuvers, navigating different geographic areas or certain types of roadway, avoiding certain weather/lighting conditions, and other factors can be used determine an alternative route with less associated computational complexity than a base route. In some implementations, information about route complexity can be obtained or derived from mapping data or similar that indicates, for each of various locations, driving maneuvers, or combinations thereof, a respective complexity that is required to for an autonomous vehicle to operate at such locations, driving maneuvers, or combinations thereof. The complexity information can be time-varying and/or account for current or forecasted conditions such as current or forecasted traffic conditions and/or current or forecasted weather conditions.

A difference in computational load between a base route and an alternative route can be evaluated to determine an estimated gain. In some implementations, the estimated gain can be associated with the allocation of the computational load difference to processing operations associated with participation in a distributed ledger. For example, historical outcomes and/or current data regarding the distributed ledger can be used to determine the estimated gain. As an example, an alternative route can be selected which is less computationally complex than the base route. Some of the computational load, which previously would have been utilized in navigating the base route, can instead be allocated towards processing associated with participation in a distributed ledger (e.g., performing hash operations on a block in a cryptographic blockchain). An estimated gain can estimate the value produced by allocating at least a portion of the computational load towards distributed ledger processing (e.g., the value produced by performing hash operations in a cryptographic blockchain).

In some implementations, an estimated gain can be determined for a current or forecasted route. The estimated gain can be based on a difference between the current or forecasted computational load of an autonomous vehicle and the total computational capacity of the autonomous vehicle. The current or forecasted computational load of the autonomous vehicle can be associated with the computational complexity of navigating a current or forecasted route. As an example, a forecasted route through a rural environment can, based on its relatively low computational complexity and the total computational capacity of the autonomous vehicle navigating the route, be determined to have a relatively high estimated gain.

In some implementations, the estimated gain can be determined, at least in part, based on one or more external variables. As one example, the value associated with a distributed ledger processing has historically been prone to rapid and significant short-term fluctuations (e.g., fluctuations in cryptocurrency value), thereby making it difficult to estimate the gain associated with distributed ledger processing. As another example, a forecasted energy cost can, in at least some geographic regions, fluctuate rapidly and significantly. Other external variables (e.g., degradation of computational resources, opportunity cost associated with distributed ledger processing, etc.) can also be considered when determining the estimated gain.

In some implementations, the estimated gain can be used to modify the cost associated with the current or forecasted route. The current or forecasted route can possess an associated base cost. At least some of the estimated gain associated with navigating the current or forecasted route can be used to modify (e.g., reduce) the associated cost of the route. As an example, a cost for a route can be determined and reduced based on the estimated gain associated with the route before presenting the route cost to a user. As such, a user can receive a route and associated modified (e.g., reduced) cost without being informed as to the allocation of excess computational resources.

A route can be selected from the base route and the one or more alternative routes. In some implementations, the route can be selected based at least in part on the respective estimated gains associated with each of the one or more alternative routes, a difference in travel time between routes, or both. More particularly, a travel time and estimated gain can be determined for the base route and each alternative route, and the difference between the travel times and estimated gain associated with the base route and each alternative route can be used at least in part to select a route.

As one example, the least computationally complex alternative route may be selected regardless of the difference in travel time associated with navigating the alternative route. As another example, the route with the lowest associated travel time may be selected regardless of the respective estimated gains associated with each alternative route. As yet another example, the route can be chosen based on both the respective travel time and the respective estimated gain associated with each route.

In some implementations, the route planning services of autonomous vehicle service providers can determine the optimal weighting of estimated gain versus travel time associated with routes. The weights associated with estimated gain and travel time can be statically set by an autonomous vehicle service provider or can adjust dynamically based on external factors (e.g., cost of electricity, fluctuations in market value associated with distributed ledgers, etc.). As an example, if the value associated with distributed ledger participation fluctuates, a routing service can dynamically adjust the weight given to reducing computational complexity when planning a route.

In some implementations, the route can be selected based on a user input. Route selection information that includes the respective estimated gain associated with each alternative route can be presented to a user. The route selection information can be presented to the user in a number of ways. In some implementations, the route selection information can be presented to the user using a game-like reward structure. As an example, the route selection information can represent the estimated gain associated with each alternative route using a proprietary value scheme (e.g., user reward points, application reward points, rewards for partner application services, etc.). For example, a rideshare application may display "15 reward points" in association with selecting a route C. As another example, the route selection information can represent the estimated gain associated with each alternative route as a monetary amount rewarded to the user. For example, a rideshare application may display "receive $1.25 cashback for selecting this route" in association with an alternative route. As yet another example, the estimated gain can be represented as reward points associated with a partner service (e.g., an autonomous vehicle rideshare service may provide reward points for an associated autonomous vehicle food delivery service).

In some implementations, the route selection information can include an actual gain when presented to the user. More particularly, an actual gain can be determined based on the estimated gain and presented to the user in the route information. As an example, an actual gain can be determined from the actual value generated by the allocated computational resources and can be presented to the user. It should be noted that, due to the inherent fluctuations in value associated with distributed ledger processing, the actual gain can be either greater or lower than the estimated gain. In some implementations, the actual gain can be calculated in real-time and presented to the user in a game-like fashion as the route service is provided. As an example, an actual value indicator can be displayed to the user during route service that indicates the actual value being generated by the excess computational resources as the route service progresses.

In some implementations, a modified cost associated each alternative route can be presented to the user. The base route can have an associated base cost. Each alternative route of the one or more alternative routes can have an associated modified cost. The cost associated with each alternative route can be modified based on the respective estimated gain of each alternative route. As an example, a cost associated with an alternative route can be modified by reducing the associated cost by at least some of the estimated gain associated with navigating that alternative route. The modified costs of the alternative routes and the base cost of the base routes can be presented to the user. In such a fashion, the alternative routes can generally be presented to the user with lower associated costs than the base cost.

In some implementations, the difference in travel time can be included in the route selection information and presented to the user. As an example, a base route can be presented to the user having a travel time of 8 minutes while an alternative route can be presented to the user having a travel time of 8 minutes and 45 seconds. As another example, the base route can be presented to the user without an associated travel time and an alternative route can be presented to the user as "45 seconds slower." The difference in travel time included in the route selection information can be presented in the same or substantially similar formats discussed in relation to the estimated gain. As an example, the route selection information can be presented to a user that includes both the estimated gain (e.g., "15 reward points") and the difference in travel time (e.g., "15 minutes slower). The particular implementations of presenting route selection information to a user will be depicted in greater detail in the figures and their description.

Excess computational capacity of autonomous vehicles can be allocated to processing operations. More particularly, at least a portion of the excess computational capacity can be allocated to processing operations associated with participation in a distributed ledger. It will be appreciated by those skilled in the art that such processing operations can generally include performing hash operations on a block in a cryptographic blockchain (e.g., writing a new transaction to a section of a distributed ledger, etc.), but can also include any other manner of calculations or processing operations related to participation in a distributed ledger. In some implementations, the computing resources of each autonomous vehicle of one or more autonomous vehicle can be allocated independently. More particularly, each autonomous vehicle can perform processing operations in participation with an independently selected distributed ledger. As an example, a first autonomous vehicle can perform processing operations associated with participation in a first distributed ledger while a second autonomous vehicle can perform operations associated with participation in a second distributed ledger. As another example, the excess computational capacity of both a first and a second autonomous vehicle can be allocated towards participation in the same distributed ledger.

Although processing operations associated with participation in a distributed ledger can provide significant value, the rewards associated with such operations can, in some instances, be rewarded only to the first computing device (e.g., one autonomous vehicle) to complete a computing task. As such, the value rewarded by these operations can be at least somewhat random, in turn making an associated actual gain difficult to estimate. Therefore, in some implementations, the excess computational capacity of multiple autonomous vehicles can be pooled together. More particularly, the excess computational capacity of multiple autonomous vehicles can be pooled towards processing operations associated with one computational task of a distributed ledger. As an example, the excess computational capacity of multiple autonomous vehicles can be pooled to perform hash operations on the same block in a cryptographic blockchain. By pooling the excess computational resources of multiple autonomous vehicles towards the same computational task, the chance of the pooled autonomous vehicles receiving a reward increases, therefore reducing the fluctuations associated with receiving a reward.

In some implementations, an autonomous vehicle service provider can determine how autonomous vehicles are pooled and which computational tasks the pooled autonomous vehicles can process. As an example, an autonomous vehicle service provider can pool their autonomous vehicles into three individual processing pools, each processing pool performing processing operations associated with different distributed ledgers. As another example, the autonomous vehicle service provider, in response to a fluctuation in values associated with different distributed ledgers, can dynamically re-pool their autonomous vehicles into one pool to perform processing operations associated with one distributed ledger.

Various means can be configured to perform the methods and processes described herein. For example, a computing system can include data obtaining unit(s), excess capacity determination unit(s), resource allocation unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain data (e.g., computational status data) from an autonomous vehicle that includes an indication of the current or forecasted computational load (e.g., computational resource utilization) of the autonomous vehicle. A data obtaining unit is an example of means obtaining such data from an autonomous vehicle at an operations computing system as described herein.

The means can be configured to determine an amount of excess computational capacity of each autonomous vehicle of the one or more autonomous vehicles. For example, the means can be configured to determine a difference between the amount of total computational capacity for each autonomous vehicle and to the amount of computational capacity they are using or are forecasted to use. An excess capacity determination unit is one example of a means for determine an amount of excess computational capacity as described herein.

The means can be configured to allocate the excess computational capacity of each autonomous vehicle to processing operations. For example, the means can be configured to allocate at least a portion of the excess capacity of each autonomous vehicle towards processing operations associated with participation in a distributed ledger (e.g., cryptographic hash operations). A resource allocation unit is one example of a means for allocating at least a portion of excess computational resources as described herein.

Thus, the systems and methods described herein may provide a number of technical effects and benefits. More particularly, the disclosed technology provides for allocation of computational capacity that would otherwise be unused towards computational tasks that can generate value (e.g., participation in a distributed ledger). Computational resources for implementing autonomous driving in autonomous vehicles can require a substantial amount of specialized processing power to yield effective and accurate results. As such, these computational resources present a significant, and sometimes prohibitive, hardware investment for autonomous vehicle owners and service providers. The disclosed technology allows these owners and service providers to more efficiently utilize existing hardware (e.g., graphics processing units, specialized hardware accelerators, etc.) to generate significant value and offer services at a lower cost to users.

Additional technical effects and advantages can be achieved by allocating unused computational capacity of autonomous vehicles towards other tasks. Although processing operations associated with participation in a distributed ledger are generally considered, unused computational capacity can also be allocated towards other distributed computing tasks. As an example, unused computational capacity can be allocated towards processing operations associated with participation in disease research projects (e.g., folding@home, Great Internet Mersenne Prime Search (GIMPS), SETI@home, etc.). In such a fashion, autonomous vehicle service providers and owners can allocate unused computational capacity towards charitable causes. As another example, excess computational capacity can be allocated towards autonomous vehicle service level computational tasks (e.g., route planning, fleet management, etc.). By offloading computationally complex processing tasks to unused computational resources in a distributed computing network (e.g., an autonomous vehicle fleet) a service provider can significantly reduce service-level processing operations and their associated costs.

Additional technical effects and benefits can be achieved by selecting routes based at least in part on the estimated gain associated with excess computational resource allocation. Autonomous vehicle service providers can generate additional value from autonomous vehicles by selecting routes that allow for more allocation of computational resources towards participation in distributed ledgers. Further, an autonomous vehicle service provider can choose to pass this value on to users, reducing costs associated with using their respective services (e.g., a rideshare service).

Further, presenting to users the estimated gains associated with allocation of excess computational resources allows service providers to reduce prices and incentivize users to choose their platform. As an example, by presenting a user with reward points associated with a less computationally complex alternative route, vehicle service providers can reward users with lower costs and/or reward points. As such, the improved methods for allocation of unused computational resources disclosed herein leads to more efficient utilization of expensive and sophisticated computational resources used for implementing autonomous driving. Further, the disclosed technology can achieve reduced route costs, improved user retention, and improved autonomous vehicle route planning services.

With reference to the figures, example embodiments of the present disclosure will be discussed in further detail.

FIG. 1 depicts a block diagram of an example system 100 for controlling the computational functions of an autonomous vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the vehicle 102 to determine if the computational resources (e.g., vehicle computing system 112) is unused or under-utilized. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), the current or forecasted navigational route of the vehicle, and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the vehicle 102 in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. As one example, the vehicle computing system 112 can include specialized hardware devices for autonomous driving data processing (e.g., graphics processing units, hardware accelerators, etc.). These specialized hardware devices can possess processing capacity sufficient to process data in the worst-case data processing situations the autonomous vehicle can encounter (e.g., left turns in an urban environment, rain/snow conditions, etc.). As another example, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include the one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The autonomy sensor data 116 can be indicative of locations associated with the one or more objects within the surrounding environment of the vehicle 102 at one or more times. For example, autonomy sensor data 116 can be indicative of one or more LIDAR point clouds associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The perception system 124 can identify one or more objects that are proximate to the vehicle 102 based on autonomy sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around an vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the system on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat).

Figure 2:
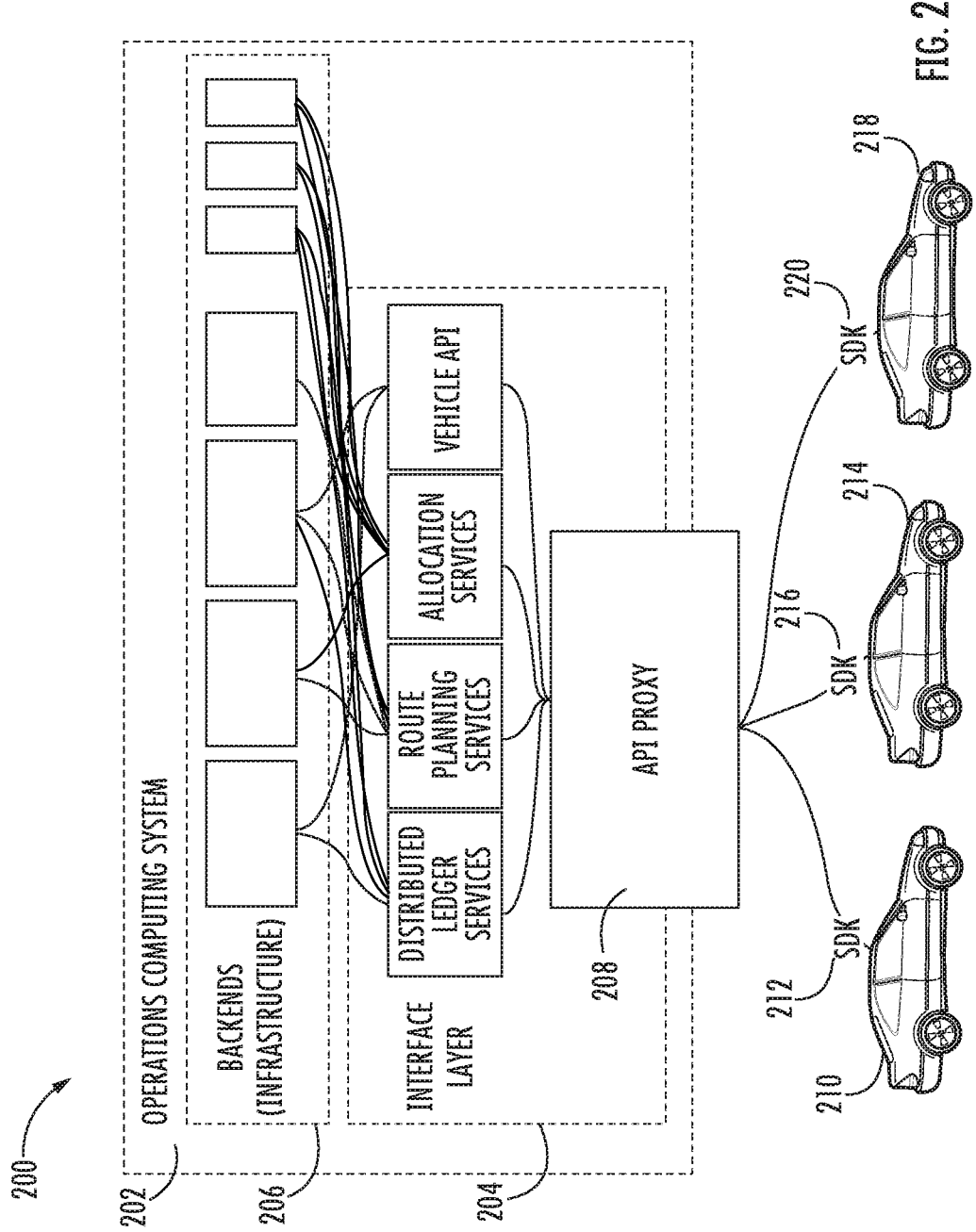
FIG. 2 depicts an example autonomous vehicle infrastructure system for resource allocation according to example embodiments of the present disclosure.

FIG. 2 depicts an example of an autonomous vehicle infrastructure system 200 for resource allocation according to example embodiments of the present disclosure. The operations computing system 202 can be in communication with one or more vehicles, such as autonomous vehicles 210, 214, and 218. The operations computing system 202 can provide for communication between a plurality of backend services 206 and one or more autonomous vehicles (e.g., 210, 214, and/or 218) via a plurality of interfaces 204. In some implementations, the operations computing system 202 can include application programming interface (API) proxy 208 to act as a central gateway to the operations computing system 202 for communications to/from the autonomous vehicles. In some embodiments, an autonomous vehicle (e.g., 210, 214, and/or 218) can communicate with the API proxy 208 via an SDK associated with the autonomous vehicle (e.g., SDK 212, SDK, 216, or SDK 220), as described herein.

The interface layer 204 can connect a number of backend services (e.g., distributed ledger services, route planning services, allocation services, vehicle API, etc.) The operations computing system 202 can utilize these services in conjunction with the interface layer 204 to enable the allocation of at least a portion of unused or otherwise under-utilized computing resources. As an example, the operations computing system 202 can utilize allocation services of the backend infrastructure 206 to evaluate the current or forecasted computational load associated with the routes navigated by autonomous vehicles 210, 214, and 218. As another example, the operations computing system 202 can, through interface layer 204 and utilizing distributed ledger services in the backend infrastructure 206, allocate and/or reallocate computing resources associated with autonomous vehicles 210, 214, and 218 towards processing operations associated with participation in a distributed ledger service(s). In such fashion, the operations computing system 202 can monitor the current or forecasted computational load associated with autonomous vehicles and, based on the current or forecasted computational load, allocate and/or reallocate computing resources towards distributed computing tasks (e.g., processing operations associated with participation in a distributed ledger service).

Figure 3:
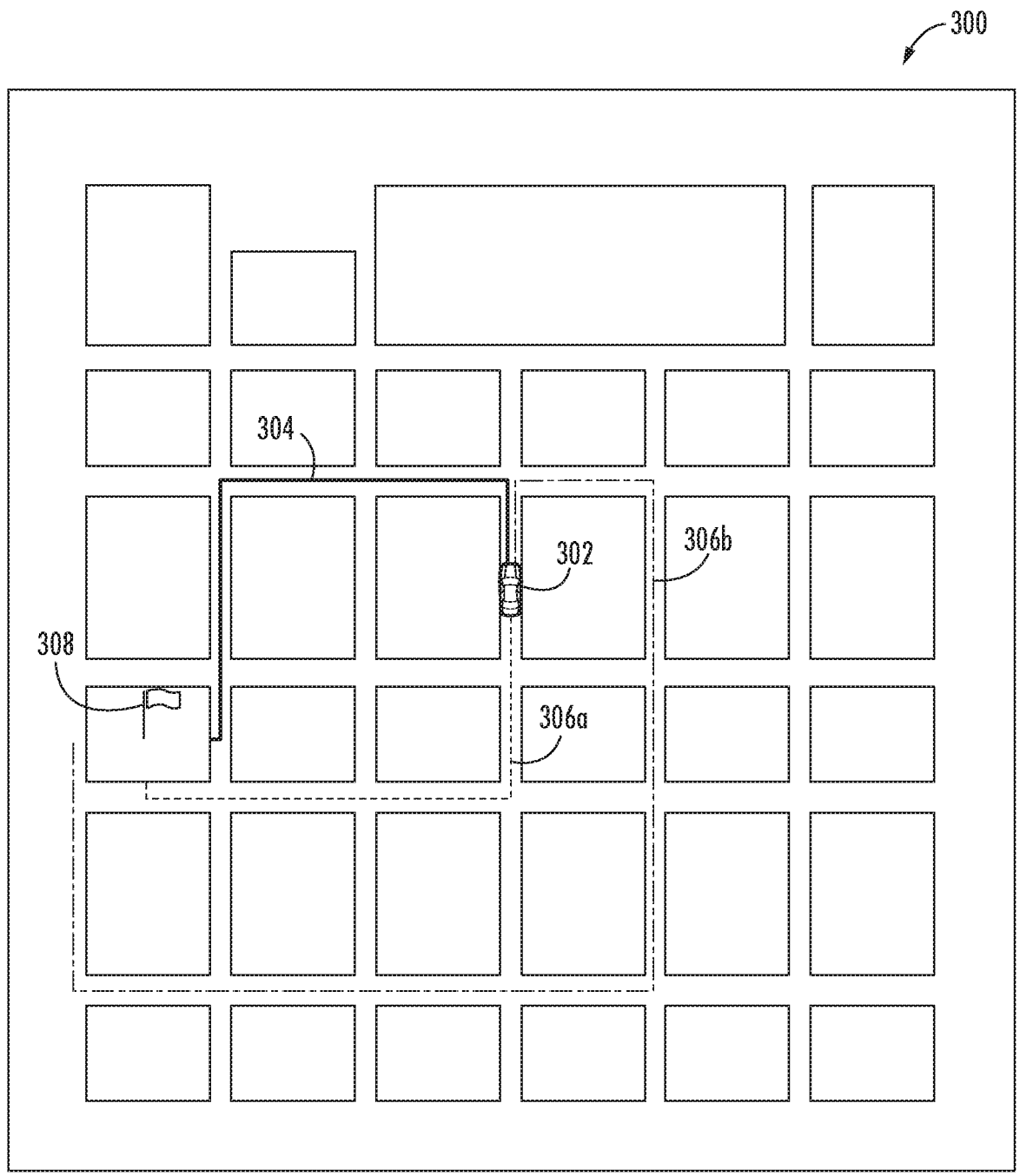
FIG. 3 depicts an example representation of automated route selection based on computational cost according to example embodiments of the present disclosure.

FIG. 3 depicts an example system for automated route selection based on computational cost according example embodiments of the present disclosure. The system 300 can determine a route for an autonomous vehicle 302. As depicted, the autonomous vehicle 302 is navigating a dense urban environment. However, it should be understood that this environment is chosen merely to illustrate example embodiments of the present disclosure. Rather, the system 300 can also select routes based on computational cost using any type of autonomous vehicle (e.g., airborne, water-based, etc.) navigating any sort of route (e.g., rural, urban, etc.). The system can generate one or more potential routes for autonomous vehicle 302. A route can be either a base route (e.g., base route 304) or one or more alternative routes (e.g., alternative routes 306a and 306b). Each route of the base route 306 and the alternative routes (e.g., 306a and 306b), while navigating to the same destination 308, can possess a different associated computational load.

The base route 304 can be generated with a base route complexity primarily focused on arriving at a destination in an optimal amount of time. As such, the base route 304 is generally the most direct (e.g., the lowest travel time) route to arrive at the chosen destination. Each of the alternative routes 306a and 306b can be generated with a computational complexity less than the base route. As such, the computational complexity associated with each alternative route (e.g., 306a and 306b) is generally less than the computational complexity of the base route, while the travel time associated with each alternative route (e.g., 306a and 306b) is generally higher than the travel time associated with the base route.

The computational load associated with a route (e.g., 304, 306a, 306b) can be determined based on a number of factors, including the number and type of driving maneuvers performed in the route (e.g., turns, roundabout navigation, intersection navigation, lane changes, etc.). In the current example, the base route 304 utilizes a number of computationally complex maneuvers (e.g., two left turns) to navigate to the destination 308. Each of the alternative routes 306a and 306b utilize less complex driving maneuvers (e.g., right turns) navigating to the destination and, as such, are less computationally complex than the base route. Accordingly, two routes that navigate to the same destination using different maneuvers may possess significantly different computational loads. Other factors, such as visibility, light conditions, weather conditions, etc., can further affect the computational load associated with navigating a route.

A difference in computational load between the base route 304 and the alternative routes 306a and 306b can be evaluated to determine an estimated gain. In some implementations, the estimated gain can be associated with the allocation of the computational load difference to processing operations associated with participation in a distributed ledger. As an example, an alternative route (e.g., 306a or 306b) can be selected which is less computationally complex than the base route 304. Some of the computational load, which previously would have been utilized in navigating the base route 304, can instead be allocated towards processing associated with participation in a distributed ledger (e.g., performing hash operations on a block in a cryptographic blockchain). An estimated gain can estimate the value produced by allocating at least a portion of the computational load towards distributed ledger processing (e.g., the value produced by performing hash operations in a cryptographic blockchain).

The system 300 can select a route of the three routes (e.g., 304, 306a, 306b) based on the estimated gain associated with each route. In some implementations, the system 300 may select the alternative route (e.g., 306a or 306b) with the lowest associated computational load, and therefore, the highest estimated gain. Alternatively, in some implementations, the system 300 may select the route with the lowest associated travel time (e.g., the base route 304). In some implementations, the system 300 can select a route based on both the respective travel time and the respective estimated gain associated with each route.

Figure 4A:
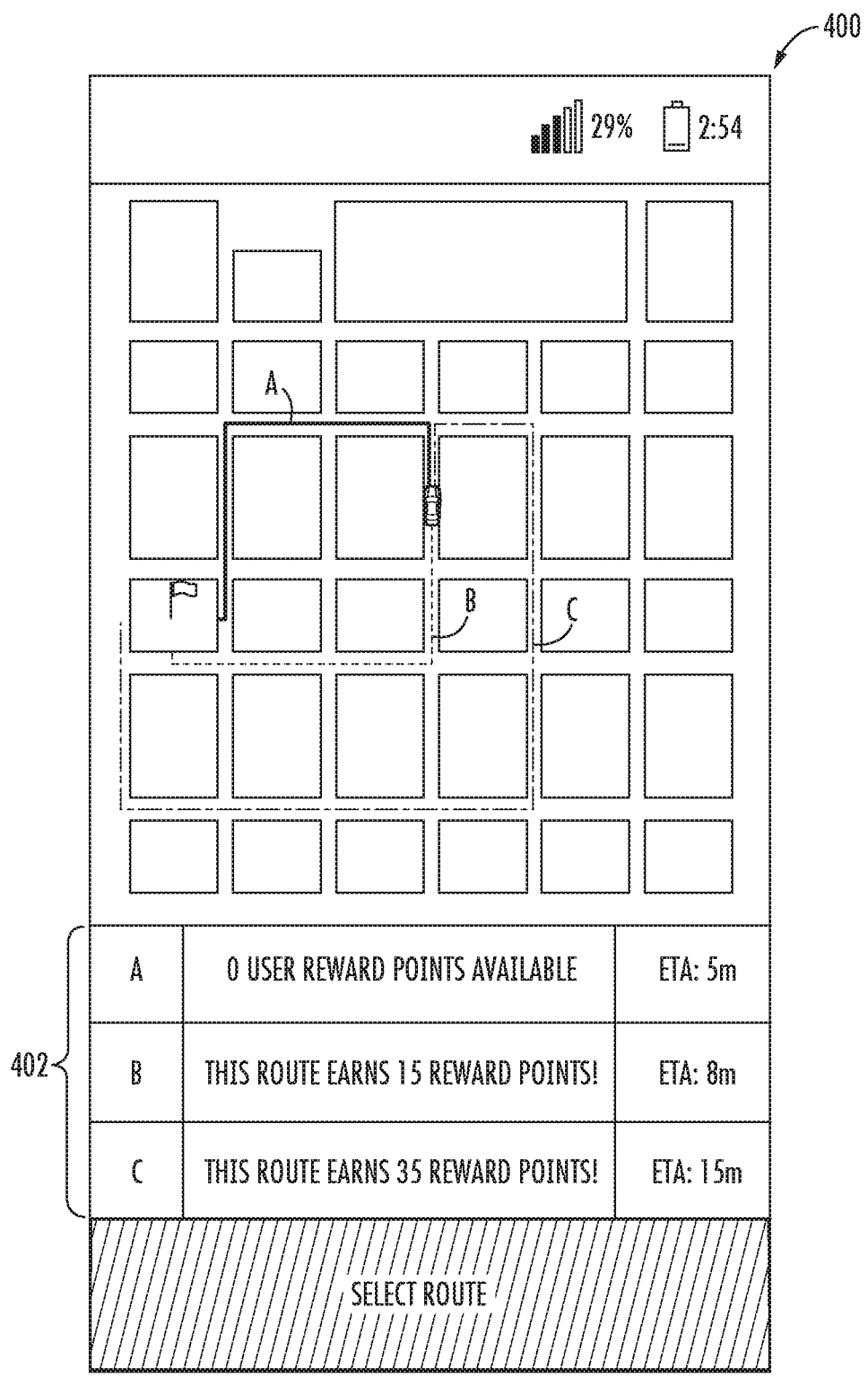
FIG. 4A depicts an example user route selection interface utilizing a game-like reward structure according to example embodiments of the present disclosure.

FIG. 4A depicts an example user route selection interface utilizing a game-like reward structure according to example embodiments of the present disclosure. A user computing device 400 (e.g., a tablet, smartphone, etc.) can display a route selection interface to a user of an autonomous vehicle rideshare service. The user can utilize the route selection interface to select a route for the autonomous rideshare service to provide. The rideshare routing service determines three routes (e.g., a base route A and two alternative routes B and C) and displays the routes to the user. Further, route selection information 402 can be presented to the user including reward points associated with each route and a travel time associated with each route. As an example, route information for route A displays 0 reward points and a travel time of 5 minutes. As another example, route B displays 15 reward points and a travel time of 8 minutes.

The user can select a route based on the displayed route selection information 402. As an example, a user primarily focused on travel time may select the route with the lowest associated travel time (e.g., route A). As another example, a user relatively unconcerned with travel time may select the route with the highest associated reward points (e.g., route C). Although reward points are depicted in the example embodiment, any sort of game-like reward structure can be utilized. As an example, digital currency can be presented to the user to be spent in associated game applications (e.g., mobile video-game applications). As another example, digital reward points can be presented to the user to be spent in associated food delivery applications (e.g., an autonomous vehicle food delivery service associated with the rideshare service.)

Figure 4B:
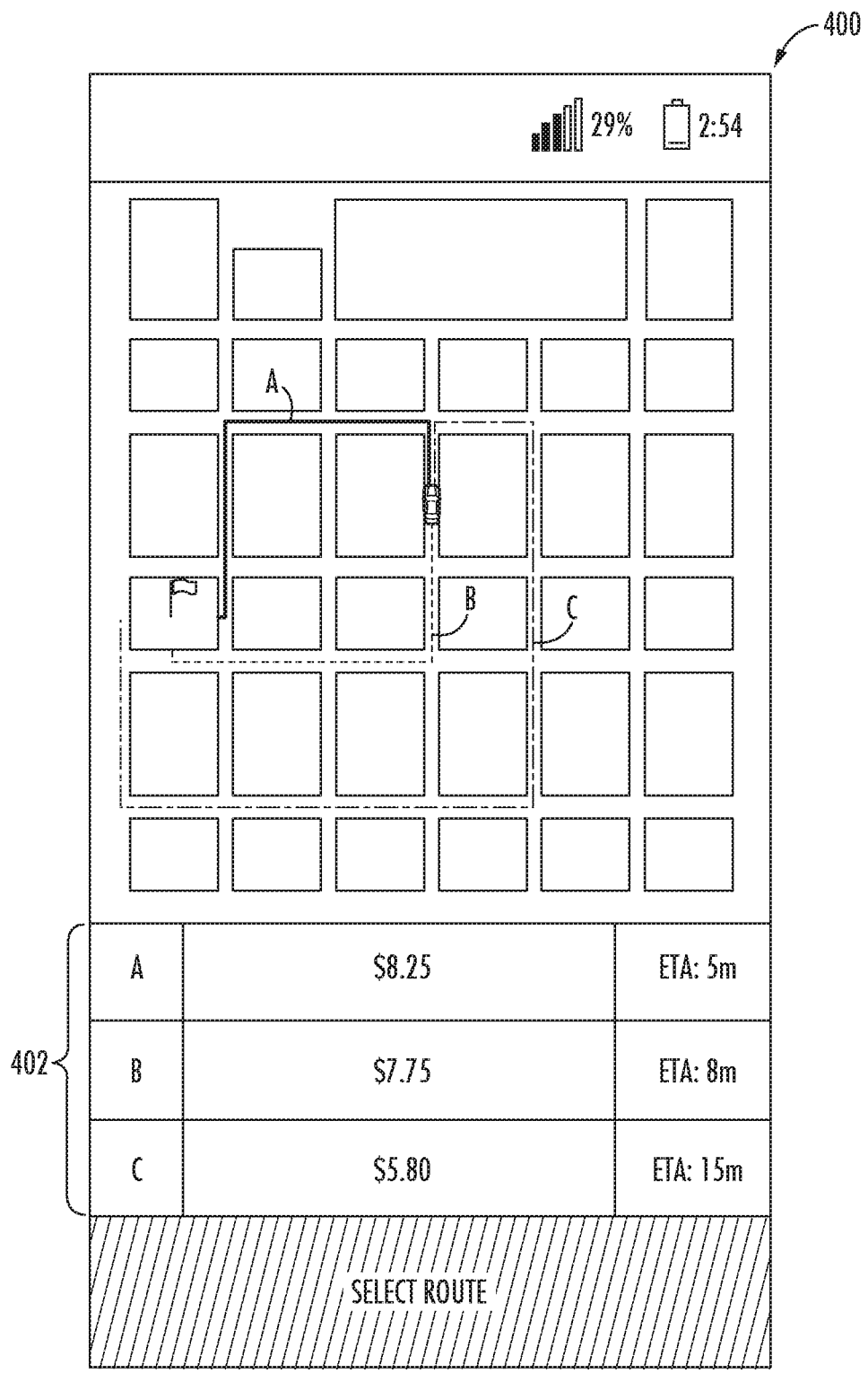
FIG. 4B depicts an example user route selection interface utilizing route cost modifications according to example embodiments of the present disclosure.

FIG. 4B depicts an example user route selection interface utilizing route cost modifications according to example embodiments of the present disclosure. As described in FIG. 4A, a user device 400 can display route selection information associated with one or more routes (e.g., routes A, B, and C). The route selection information 402 can include a travel time and route cost associated with each route. The route cost associated with each route can be modified based on the complexity of the route. As described in FIG. 3, an estimated gain can be associated with each route (e.g., routes A, B, and C). The estimated gain can be used to modify the cost associated with each route. Routes A, B, and C can each possess an associated base cost. At least some of the estimated gain associated with navigating each of routes A, B, and C can be used to modify (e.g., reduce) the associated cost of the route. As an example, a cost for route A can be determined and reduced based on the estimated gain associated navigating with route A before presenting the route cost to a user. As such, the route selection information 402 including the modified (e.g., reduced) costs associated with each route can be displayed to the user without informing the user as to the allocation of excess computational resources.

Figure 4C:
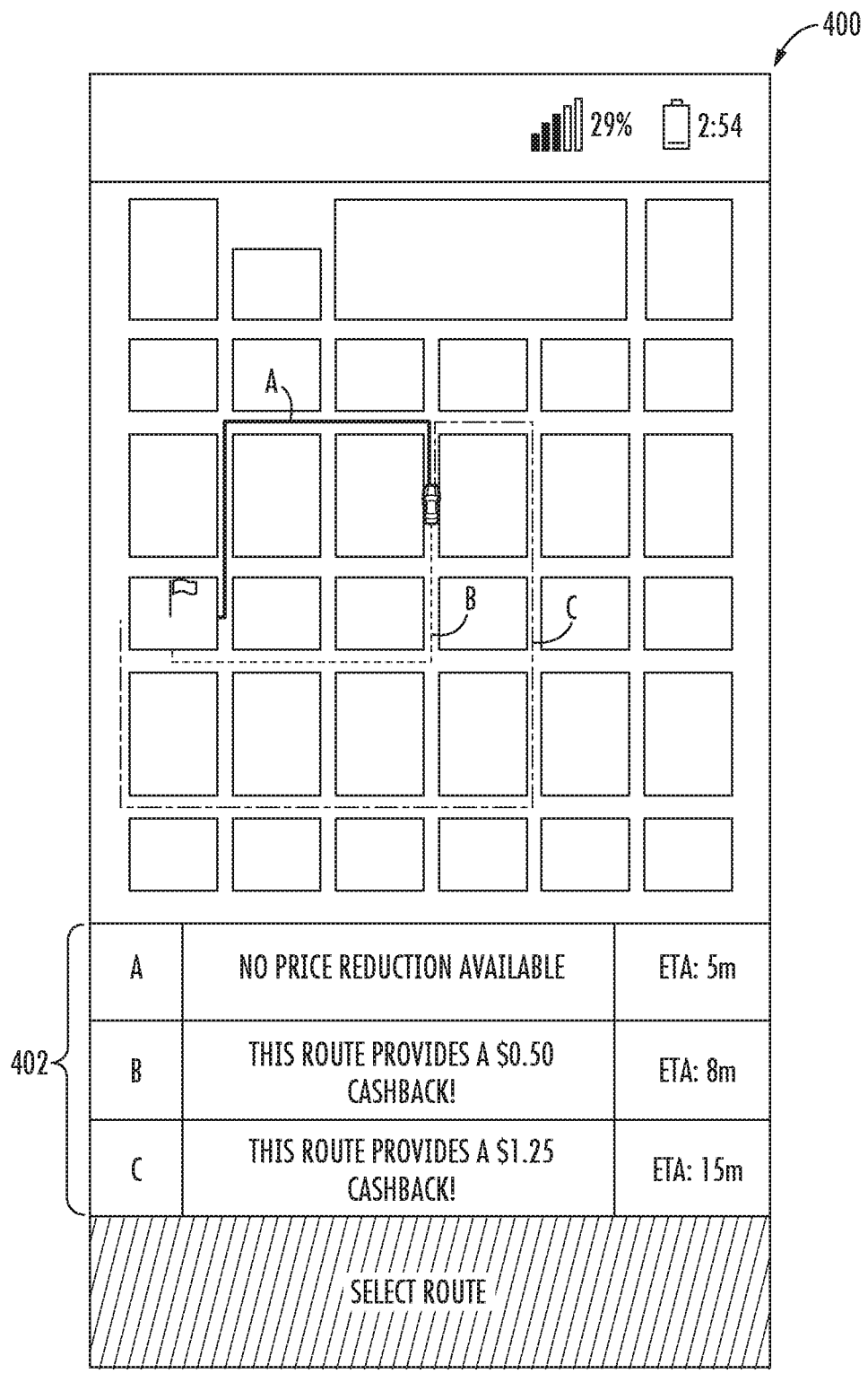
FIG. 4C depicts an example user route selection interface utilizing a reward structure based on actual gain according to example embodiments of the present disclosure.

FIG. 4C depicts an example user route selection interface utilizing a reward structure based on actual gain according to example embodiments of the present disclosure. As described in FIG. 4A, a user device 40 can display route selection information associated with one or more routes (e.g., routes A, B, and C). The route selection information 402 can include a travel time an actual gain associated with each route. As described in FIG. 3, an estimated gain can be associated with each route (e.g., routes A, B, and C). An actual gain can be included in the route selection information 402 based on the actual value generated by allocating at least a portion of the computational resources from each route. It should be noted that, due to the inherent fluctuations in value associated with distributed ledger processing, the actual gain can be either greater or lower than the estimated gain. The actual gain, in some implementations, can be presented to the user as a cashback system. More particularly, each route (e.g., routes A, B, and C) can display an associated cash reward associated with the actual value derived from navigating the route. As an example, route A displays "no price reduction available," as the actual gain associated with navigating the route is minimal or nonexistent. As another example, route C displays "$1.25 cashback!" as the actual gain associated with navigating the route is valued at least at $1.25. In this fashion, the actual gain derived from navigating the route can be at least partially distributed back to the user to offset route service costs.

In some implementations, the actual gain can be calculated in real-time and presented to the user in a game-like fashion as the route service is provided. As an example, an actual value indicator can be displayed to the user during route service that indicates the actual value being generated by the excess computational resources as the route service progresses.

Figure 5:
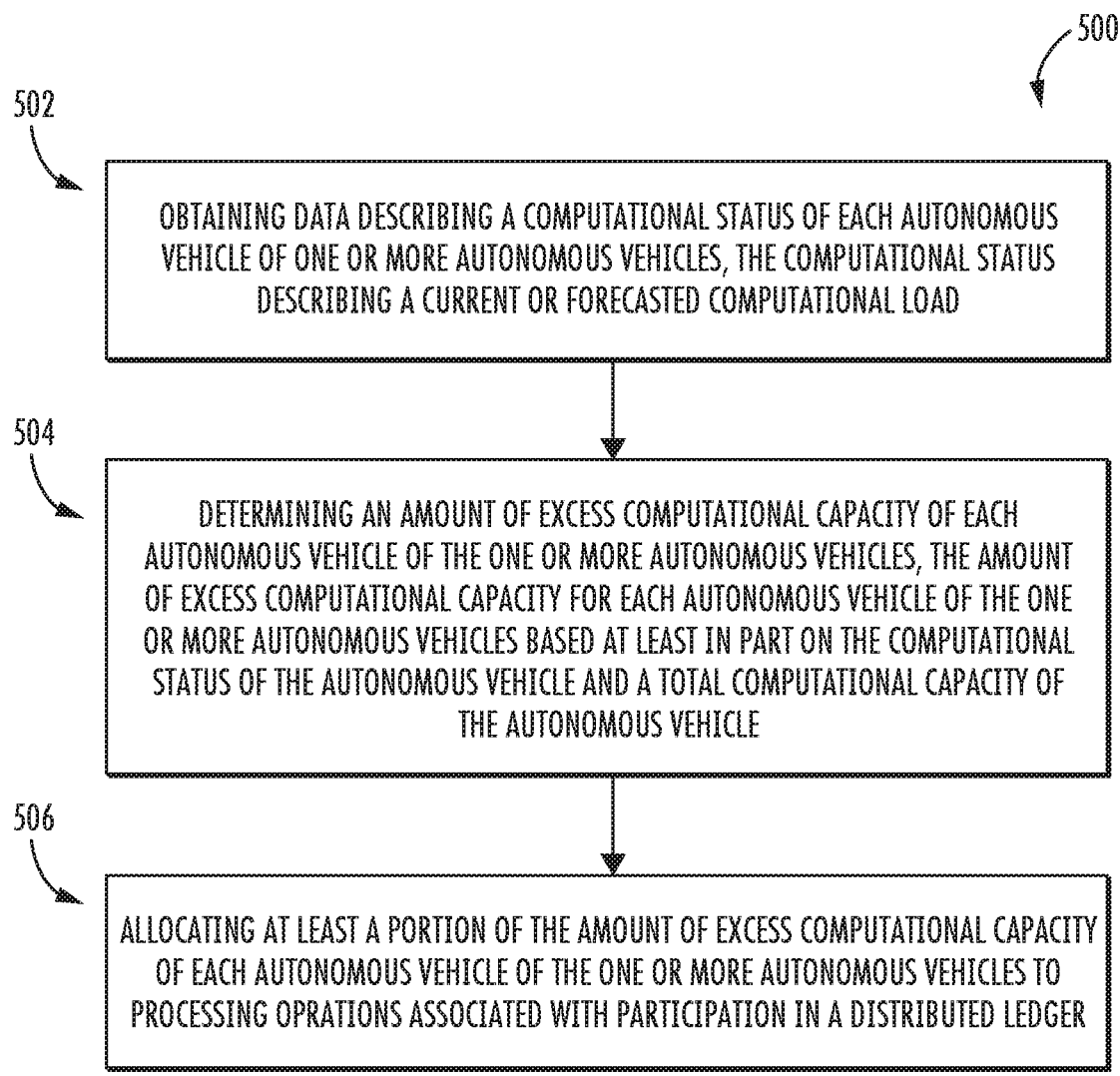
FIG. 5 depicts a flow chart diagram of an example method to allocate excess computational resources of an autonomous vehicle according to example embodiments of the present disclosure.

FIG. 5 depicts a flow diagram of an example method 500 to allocate excess computational resources of an autonomous vehicle according to example embodiments of the present disclosure. One or more portion(s) of the operations of method 500 can be implemented by one or more computing systems that include, for example, a vehicle computing system (e.g., vehicle computing system 112, etc.), one or more portions of an operations computing system (e.g., operations computing system 202, etc.). Each respective portion of the method 500 can be performed by any (or any combination) of the computing device(s) of the respective computing system. Moreover, one or more portion(s) of the method 500 can be implemented as an algorithm on the hardware components of the device(s) described herein, for example, to facilitate allocation of unused or underutilized computational resources. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 502, the method 500 can include obtaining data describing a computational status of each autonomous vehicle of one or more autonomous vehicles, the computational status describing a current or forecasted computational load. The current or forecasted computational load for an autonomous vehicle can be based on the complexity of a route the autonomous vehicle is currently navigating or is forecasted to navigate. As an example, a route taken through a dense urban environment may be significantly more complex than navigating a rural backroad, and therefore may have a higher forecasted computational load. In some implementations, the complexity associated with navigating a route can be based, at least in part, on the driving maneuvers (e.g., turns, roundabout navigation, intersection navigation, lane changes, etc.) performed in the route. As an example, performing a left turn maneuver is generally considered to be more computationally complex than performing a right turn maneuver. Accordingly, two routes that navigate to the same destination using different maneuvers may possess significantly different computational complexities. Other factors, such as visibility, light conditions, weather conditions, etc., can further affect the computational load associated with navigating a route.

At 504, the method 500 can include determining an amount of excess computational capacity of each autonomous vehicle of the one or more autonomous vehicles, the amount of excess computational capacity for each autonomous vehicle of the one or more autonomous vehicles based at least in part on the computational status of the autonomous vehicle and a total computational capacity of the autonomous vehicle. The amount of excess computational capacity can be based on the current or forecasted computational load and the total computational capacity of the autonomous vehicles. The total computational capacity of an autonomous vehicle can be based at least in part on the computational resources (e.g., graphics processing units, specialized hardware accelerators, other integrated circuits, etc.) on-board the vehicle. As an example, a first type of autonomous vehicle with a relatively small total computational capacity may not produce any excess computational capacity while navigating a certain route, while a second type of autonomous vehicle with a relatively large total computational capacity may produce significant excess computational capacity navigating the same route.

At 506, the method 500 can include allocating at least a portion of the amount of excess computational capacity of each autonomous vehicle of the one or more autonomous vehicles to processing operations associated with participation in a distributed ledger. It will be appreciated by those skilled in the art that such processing operations can generally include performing hash operations on a block in a cryptographic blockchain (e.g., writing a new transaction to a section of a distributed ledger, etc.), but can also include any other manner of calculations or processing operations related to participation in a distributed ledger. In some implementations, the computing resources of each autonomous vehicle of one or more autonomous vehicle can be allocated independently. More particularly, each autonomous vehicle can perform processing operations in participation with an independently selected distributed ledger. As an example, a first autonomous vehicle can perform processing operations associated with participation in a first distributed ledger while a second autonomous vehicle can perform operations associated with participation in a second distributed ledger. As another example, the excess computational capacity of both a first and a second autonomous vehicle can be allocated towards participation in the same distributed ledger.

Figure 6:
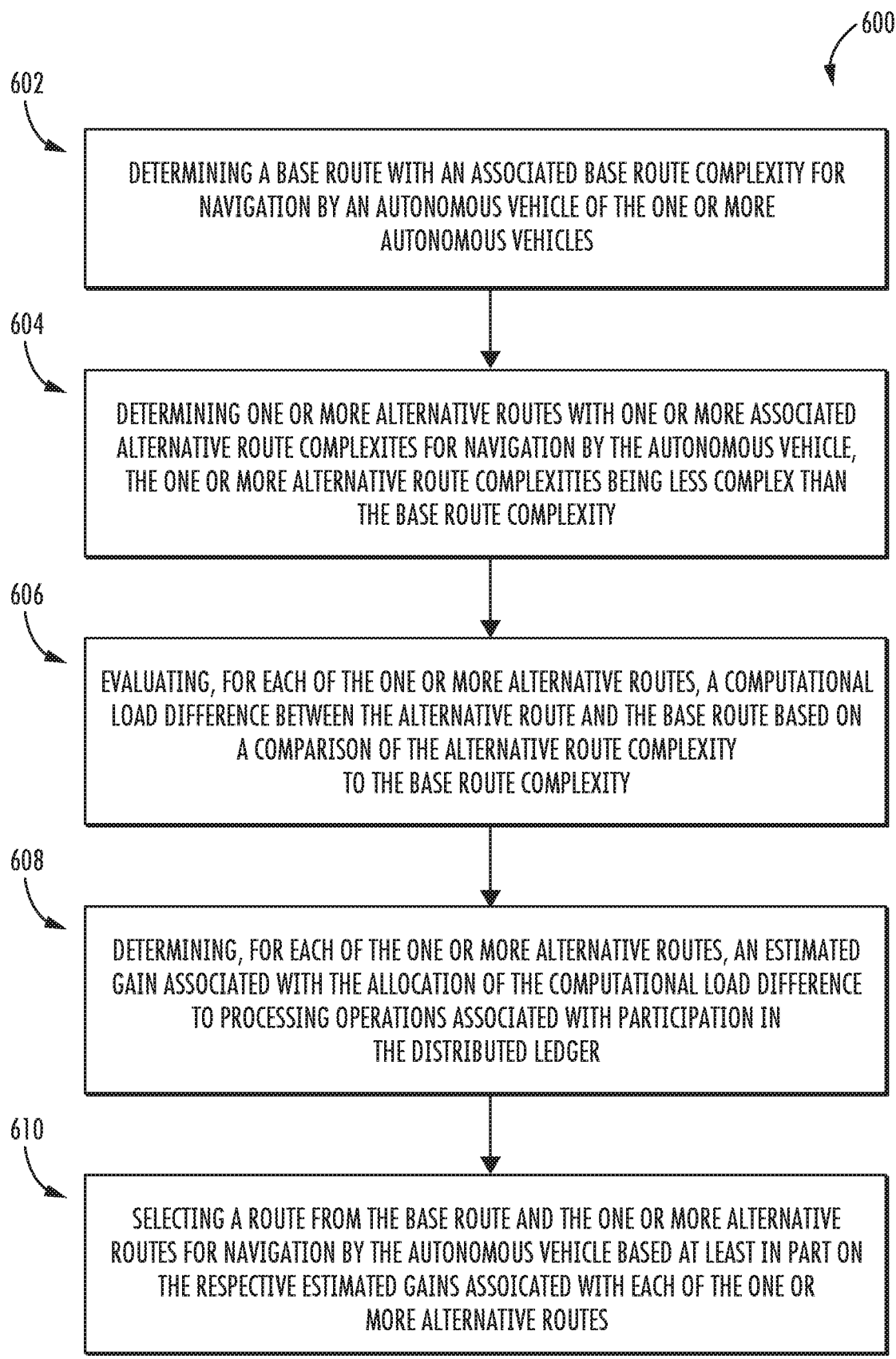
FIG. 6 depicts a flow chart diagram of an example method to select a route based on estimated gains associated with routes according to example embodiments of the present disclosure.

FIG. 6 depicts a flow chart diagram of an example method to select a route based on estimated gains associated with routes according to example embodiments of the present disclosure. One or more portion(s) of the operations of method 600 can be implemented by one or more computing systems that include, for example, a vehicle computing system (e.g., vehicle computing system 112, etc.), one or more portions of an operations computing system (e.g., operations computing system 202, etc.). Each respective portion of the method 600 can be performed by any (or any combination) of the computing device(s) of the respective computing system. Moreover, one or more portion(s) of the method 600 can be implemented as an algorithm on the hardware components of the device(s) described herein, for example, to facilitate allocation of unused or underutilized computational resources. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 602, the method 600 can include determining a base route with an associated base route complexity for navigation by an autonomous vehicle of the one or more autonomous vehicles. A base route can be determined with an associated base route complexity primarily focused on arriving at a destination in an optimal amount of time. As an example, a base route can be determined that uses a relatively high number of computationally complex driving maneuvers but arrives at a target destination in the most optimal amount of time. As another example, a base route can be determined that navigates through a computationally complex geographic area but arrives at a target destination in the most optimal amount of time. In some implementations, information about route complexity can be obtained or derived from mapping data or similar that indicates, for each of various locations, driving maneuvers, or combinations thereof, a respective complexity that is required to for an autonomous vehicle to operate at such locations, driving maneuvers, or combinations thereof. The complexity information can be time-varying and/or account for current or forecasted conditions such as current or forecasted traffic conditions and/or current or forecasted weather conditions.

At 604, the method 600 can include determining one or more alternative routes with one or more associated alternative route complexities for navigation by the autonomous vehicle, the one or more alternative route complexities being less complex than the base route complexity. One or more alternative routes can be determined, each with an associated complexity that is less complex than the base route. As an example, one or more alternative routes can be determined that use a relatively lower number of computationally complex driving maneuvers but arrive at a target destination in a less optimal amount of time than the base route. As another example, one or more alternative routes can be determined that can navigate through a less computationally complex area than the base route but arrive at a target destination in a less optimal amount of time. Utilizing different driving maneuvers, navigating different geographic areas or certain types of roadway, avoiding certain weather/lighting conditions, and other factors can be used determine an alternative route with less associated computational complexity than a base route. In some implementations, information about route complexity can be obtained or derived from mapping data or similar that indicates, for each of various locations, driving maneuvers, or combinations thereof, a respective complexity that is required to for an autonomous vehicle to operate at such locations, driving maneuvers, or combinations thereof. The complexity information can be time-varying and/or account for current or forecasted conditions such as current or forecasted traffic conditions and/or current or forecasted weather conditions.

At 606, the method 600 can include evaluating, for each of the one or more alternative routes, a computational load difference between the alternative route and the base route. The computational load difference can be based on a comparison of the alternative route complexity to the base route complexity.

At 608, the method 600 can include determining, for each of the one or more alternative routes, an estimated gain associated with the allocation of the computational load difference to processing operations associated with participation in the distributed ledger. In some implementations, the estimated gain can be associated with the allocation of at least a portion of the computational load difference to processing operations associated with participation in a distributed ledger. As an example, an alternative route can be selected which is less computationally complex than the base route. Some of the computational load, which previously would have been utilized in navigating the base route, can instead be allocated towards processing associated with participation in a distributed ledger (e.g., performing hash operations on a block in a cryptographic blockchain). An estimated gain can estimate the value produced by allocating at least a portion of the computational load towards distributed ledger processing (e.g., the value produced by performing hash operations in a cryptographic blockchain).

In some implementations, an estimated gain can be determined for a current or forecasted route. The estimated gain can be based on a difference between the current or forecasted computational load of an autonomous vehicle and the total computational capacity of the autonomous vehicle. The current or forecasted computational load of the autonomous vehicle can be associated with the computational complexity of navigating a current or forecasted route. As an example, a forecasted route through a rural environment can, based on its relatively low computational complexity and the total computational capacity of the autonomous vehicle navigating the route, be determined to have a relatively high estimated gain.

In some implementations, the estimated gain can be determined, at least in part, based on one or more external variables. As one example, the value associated with a distributed ledger processing has historically been prone to rapid and significant short-term fluctuations (e.g., fluctuations in cryptocurrency value), thereby making it difficult to estimate the gain associated with distributed ledger processing. As another example, a forecasted energy cost can, in at least some geographic regions, fluctuate rapidly and significantly. Other external variables (e.g., degradation of computational resources, opportunity cost associated with distributed ledger processing, etc.) can also be considered when determining the estimated gain.

At 610, the method 600 can include selecting a route from the base route and the one or more alternative routes for navigation by the autonomous vehicle based at least in part on the respective estimated gains associated with each of the one or more alternative routes. In some implementations, the route can be selected based at least in part on the respective estimated gains associated with each of the one or more alternative routes, a difference in travel time between routes, or both. More particularly, a travel time and estimated gain can be determined for the base route and each alternative route, and the difference between the travel times and estimated gain associated with the base route and each alternative route can be used at least in part to select a route. As one example, the least computationally complex alternative route may be selected regardless of the difference in travel time associated with navigating the alternative route. As another example, the route with the lowest associated travel time may be selected regardless of the respective estimated gains associated with each alternative route. As yet another example, the route can be chosen based on both the respective travel time and the respective estimated gain associated with each route.

In some implementations, the route planning services of autonomous vehicle service providers can determine the optimal weighting of estimated gain versus travel time associated with routes. The weights associated with estimated gain and travel time can be statically set by an autonomous vehicle service provider or can adjust dynamically based on external factors (e.g., cost of electricity, fluctuations in market value associated with distributed ledgers, etc.). As an example, if the value associated with distributed ledger participation fluctuates, a routing service can dynamically adjust the weight given to reducing computational complexity when planning a route. Alternatively, in some implementations, the route can be selected based on a user input.

Figure 7:
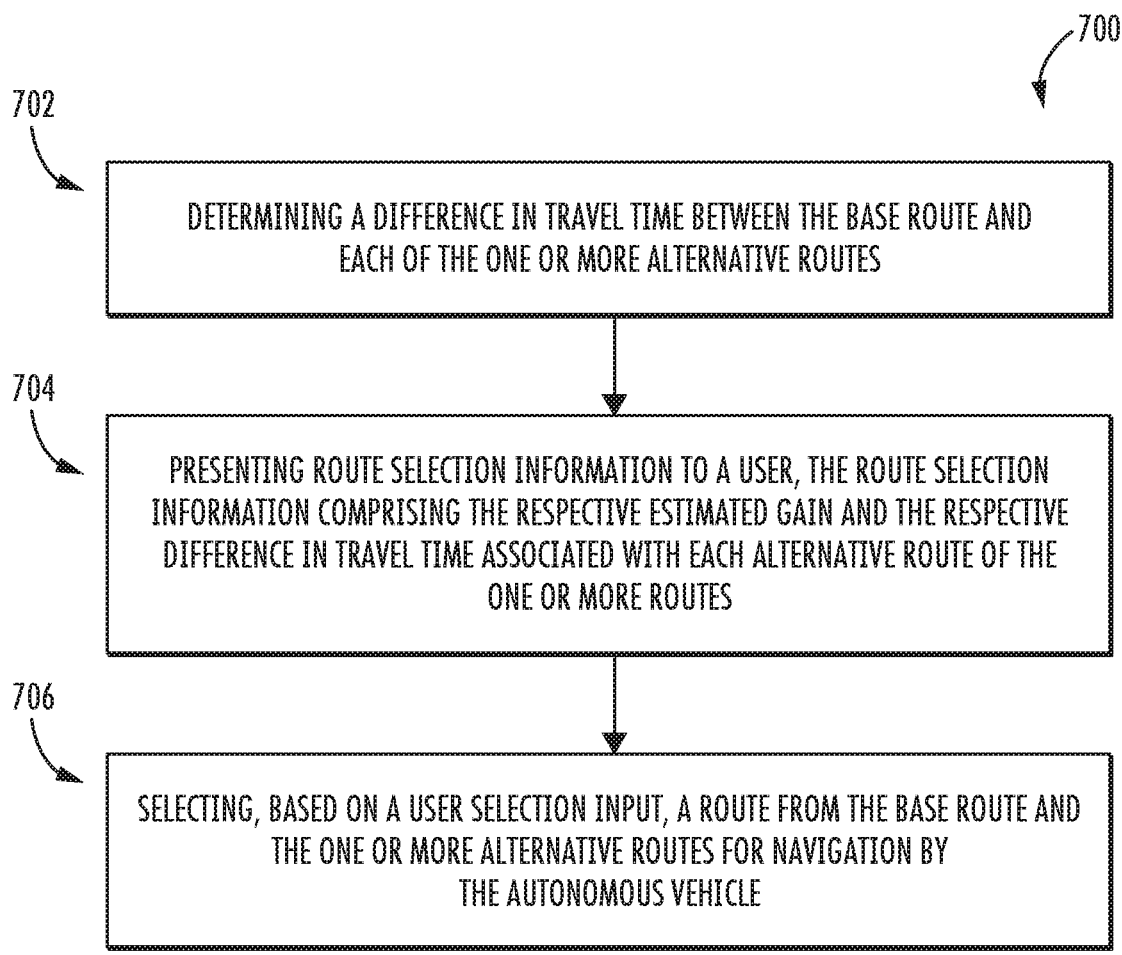
FIG. 7 depicts a flow chart diagram of an example method to select a route based on estimated gains and differences in travel time associated with routes according to example embodiments of the present disclosure.

FIG. 7 depicts a flow chart diagram of an example method to select a route based on estimated gains associated with routes according to example embodiments of the present disclosure. One or more portion(s) of the operations of method 700 can be implemented by one or more computing systems that include, for example, a vehicle computing system (e.g., vehicle computing system 112, etc.), one or more portions of an operations computing system (e.g., operations computing system 202, etc.). Each respective portion of the method 700 can be performed by any (or any combination) of the computing device(s) of the respective computing system. Moreover, one or more portion(s) of the method 700 can be implemented as an algorithm on the hardware components of the device(s) described herein, for example, to facilitate allocation of unused or underutilized computational resources. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 702, the method 700 can include determining a difference in travel time between the base route and each of the one or more alternative routes. As an example, a base route can be determined to have an associated travel time of 8 minutes while an alternative route can be determined to have an associated travel time of 8 minutes and 45 seconds.

At 704, the method 700 includes presenting route selection information to a user, the route selection information comprising the respective estimated gain and the respective difference in travel time associated with each alternative route of the one or more routes. Route selection information that includes the respective estimated gain associated with each alternative route and the travel time associated with each route can be presented to a user. The route selection information can be presented to the user in a number of ways. In some implementations, the route selection information can be presented to the user using a game-like reward structure. As an example, the route selection information can represent the estimated gain associated with each alternative route using a proprietary value scheme (e.g., user reward points, application reward points, rewards for partner application services, etc.). As another example, an actual gain can be determined from the actual value generated by the allocated computational resources and can be presented to the user.

Further, the difference in travel time can be presented to the user. As an example, a base route can be presented to the user having a travel time of 8 minutes while an alternative route can be presented to the user having a travel time of 8 minutes and 45 seconds. As another example, the base route can be presented to the user without an associated travel time and an alternative route can be presented to the user as "45 seconds slower." The difference in travel time included in the route selection information can be presented in the same or substantially similar formats discussed in relation to the estimated gain. As an example, the route selection information can be presented to a user that includes both the estimated gain (e.g., "15 reward points") and the difference in travel time (e.g., "15 minutes slower).

At 706, the method 700 includes selecting, based on a user selection input, a route from the base route and the one or more alternative routes for navigation by the autonomous vehicle. The user can select a route after viewing the displayed route selection information. After receiving the user selection input, the method can select the route based on the user selection input and implement the route for autonomous driving services (e.g., autonomous vehicle rideshare services).

Figure 8:
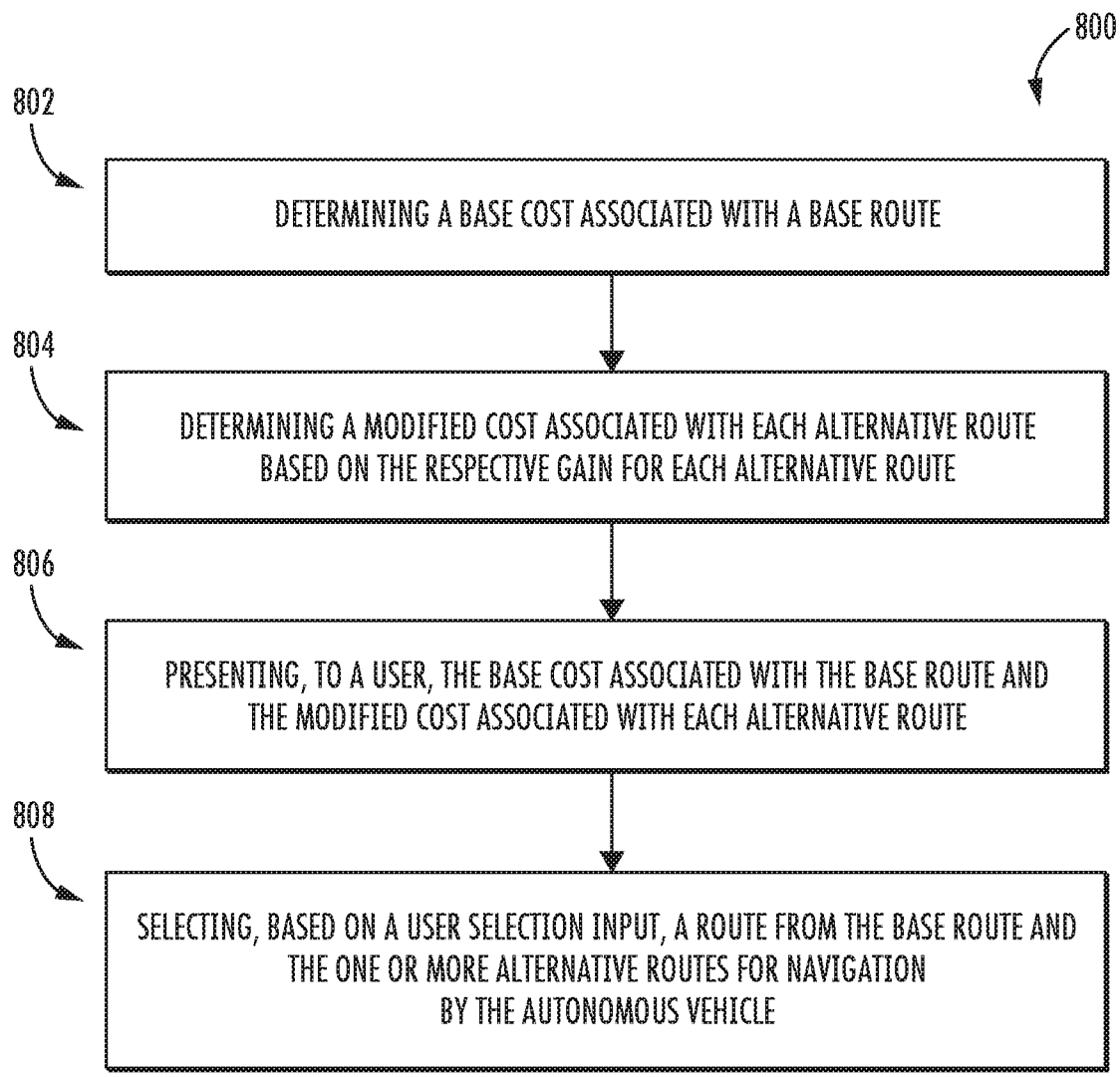
FIG. 8 depicts a flow chart diagram of an example method to reduce the cost associated with a route based on estimated gains according to example embodiments of the present disclosure.

FIG. 8 depicts a flow chart diagram of an example method to select a route based on estimated gains associated with routes according to example embodiments of the present disclosure. One or more portion(s) of the operations of method 800 can be implemented by one or more computing systems that include, for example, a vehicle computing system (e.g., vehicle computing system 112, etc.), one or more portions of an operations computing system (e.g., operations computing system 202, etc.). Each respective portion of the method 800 can be performed by any (or any combination) of the computing device(s) of the respective computing system. Moreover, one or more portion(s) of the method 800 can be implemented as an algorithm on the hardware components of the device(s) described herein, for example, to facilitate allocation of unused or underutilized computational resources. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 802, the method 800 can include determining a base cost associated with a base route. The base cost associated with a base route can be the typical price that an autonomous vehicle service provider may associate with fulfilling a route service request. As an example, an autonomous vehicle rideshare service provider may determine a cost for every mile driven in a certain geographic area. This cost can be aggregated on a per-mile basis for a requested route and presented to the user as a base cost associated with a base route.

At 804, the method 800 can include determining a modified cost associated with each alternative route based on the respective gain for each alternative route. The estimated gain can be used to modify the cost associated with the current or forecasted route. More particularly, at least some of the estimated gain associated with navigating the current or forecasted route can be used to modify (e.g., reduce) the associated cost of the route.

At 806, the method 800 can include presenting, to a user, the base cost associated with the base route and the modified cost associated with each alternative route. As an example, a cost for a route can be determined and reduced based on the estimated gain associated with the route before presenting the route cost to a user. As such, a user can be presented with the base route, one or more alternative routes, and the associated modified (e.g., reduced) costs without being informed as to the allocation of excess computational resources.

At 808, the method can include selecting, based on a user selection input, a route from the base route and the one or more alternative routes for navigation by the autonomous vehicle. As discussed in relation to FIG. 7, the user can select a route after viewing the displayed modified costs. After receiving the user selection input, the method can select the route based on the user selection input and implement the route for autonomous driving services (e.g., autonomous vehicle rideshare services).

Figure 9:
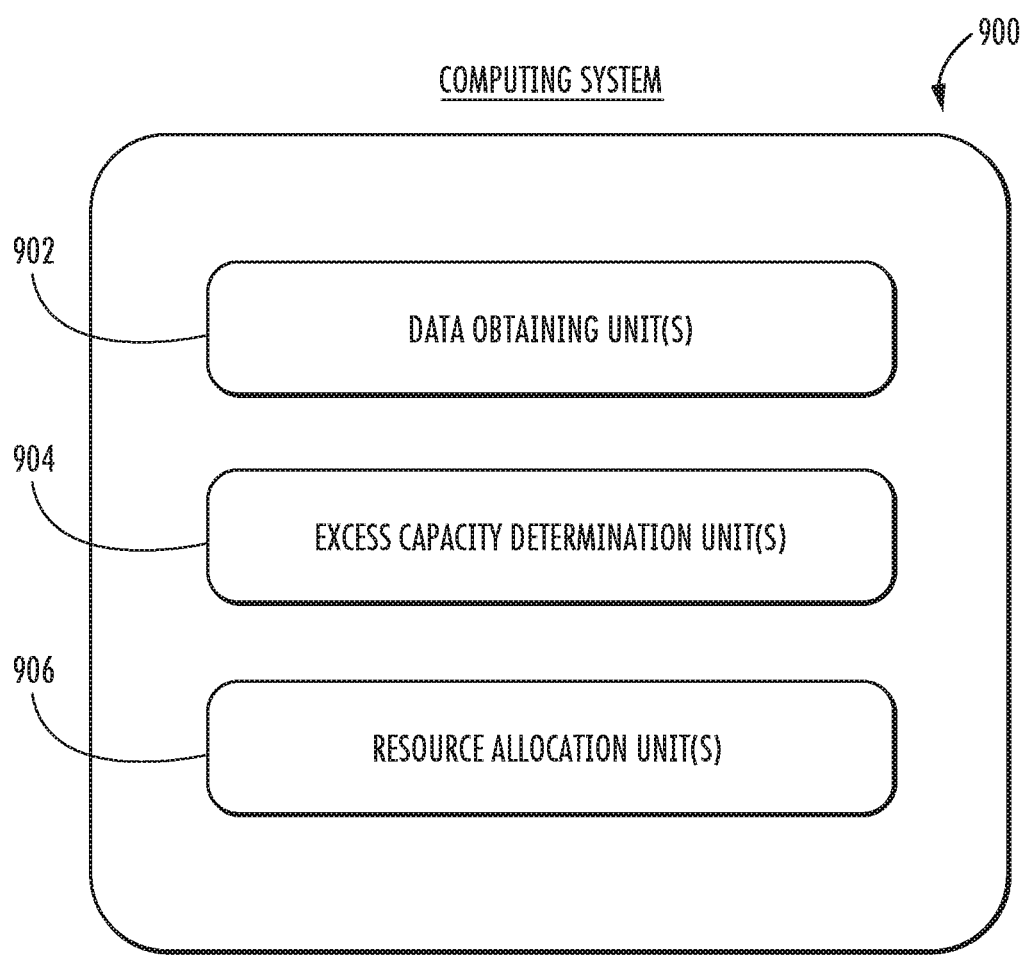
FIG. 9 depicts example units associated with a computing system for performing operations and functions according to example embodiments of the present disclosure

Various means can be configured to perform the methods and processes described herein. For example, FIG. 9 depicts an example system 900 that includes various means according to example embodiments of the present disclosure. The computing system 900 can be and/or otherwise include, for example, the computational resource allocation system. The computing system 900 can include data obtaining unit(s) 902, excess capacity determination unit(s) 904, resource allocation unit(s) 906, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., the data obtaining unit(s) 902) can be configured to obtain data (e.g., computational status data) from an autonomous vehicle that includes an indication of the current or forecasted computational load (e.g., computational resource utilization) of the autonomous vehicle. The data obtaining unit(s) 902 is an example of means obtaining such data from an autonomous vehicle at an operations computing system as described herein.

The means (e.g., the excess capacity determination unit(s) 904) can be configured to determine an amount of excess computational capacity of each autonomous vehicle of the one or more autonomous vehicles. For example, the means (e.g., the excess capacity determination unit(s) 904) can be configured to determine a difference between the amount of total computational capacity for each autonomous vehicle and to the amount of computational capacity they are using or are forecasted to use. The excess capacity determination unit(s) 904 is one example of a means for determine an amount of excess computational capacity as described herein.

The means (e.g., resource allocation unit(s) 906) can be configured to allocate at least a portion of the excess computational capacity of each autonomous vehicle to processing operations. For example, the means (e.g., resource allocation unit(s) 906) can be configured to allocate at least a portion of the excess capacity of each autonomous vehicle towards processing operations associated with participation in a distributed ledger (e.g., cryptographic hash operations). The resource allocation unit(s) 906 is one example of a means for allocating at least a portion of excess computational resources as described herein.

These described functions of the means are provided as examples and are not meant to be limiting. The means can be configured for performing any of the operations and functions described herein.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for variably allocating autonomous vehicle compute power, the method comprising:
   obtaining, by a computing system comprising one or more computing devices, data describing a total computational capacity for an autonomous vehicle;
   obtaining, by the computing system, a route for the autonomous vehicle;
   determining, by the computing system, an amount of computational resources to be used for performing one or more driving maneuvers to be performed to navigate the route;
   determining, by the computing system, an amount of excess computational capacity respectively for the autonomous vehicle based at least in part on map data indicating, for one or more locations, a computational complexity of navigating at the one or more locations, the amount of excess computational capacity corresponding to a processing capacity to process additional operations while navigating the route, the amount of excess computational capacity based at least in part on a difference between:
      the amount of computational resources to be used for performing the one or more driving maneuvers, and
      the total computational capacity; and
   initiating, by the computing system, processing of the additional operations using at least a portion of the amount of excess computational capacity while navigating the route, the additional operations associated with participation in a distributed ledger.

2. The method of claim 1, further comprising:
   determining, by the computing system, a base route with an associated base route complexity for navigation by the autonomous vehicle;
   determining, by the computing system, one or more alternative routes with one or more associated alternative route complexities for navigation by the autonomous vehicle, the one or more alternative route complexities being less complex than the base route complexity;
   evaluating, by the computing system and for each of the one or more alternative routes, a computational load difference between the alternative route and the base route based on a comparison of the alternative route complexity to the base route complexity;
   determining, by the computing system and for each of the one or more alternative routes, an estimated gain associated with allocation of the computational load difference to processing operations associated with participation in the distributed ledger; and
   selecting, by the computing system, a route from the base route and the one or more alternative routes for navigation by the autonomous vehicle based at least in part on the respective estimated gains associated with each of the one or more alternative routes.

3. The method of claim 2, wherein selecting, by the computing system, the route from the base route and the one or more alternative routes comprises:
   presenting, by the computing system and to a user, route selection information, the route selection information comprising the respective estimated gain associated with each alternative route of the one or more routes; and
   selecting, by the computing system and based on a user selection input, a route from the base route and the one or more alternative routes for navigation by the autonomous vehicle.

4. The method of claim 3, wherein presenting, by the computing system and to a user, route selection information comprises:
   determining, by the computing system, a difference in travel time between the base route and each of the one or more alternative routes; and
   presenting, by the computing system and to a user, route selection information, the route selection information comprising the respective estimated gain and the respective difference in travel time associated with each alternative route of the one or more routes.

5. The method of claim 2, wherein selecting, by the computing system, the route from the base route and the one or more alternative routes comprises:
   determining, by the computing system, a difference in travel time between the base route and each of the one or more alternative routes; and
   selecting, by the computing system, a route from the base route and the one or more alternative routes for navigation by the autonomous vehicle based at least in part on the respective estimated gains associated with the one or more alternative routes and the difference in travel time between the base route and each of the one or more alternative routes.

6. The method of claim 1, comprising:
   pooling, by the computing system, the amount of excess computational capacity of the autonomous vehicle with one or more other autonomous vehicles in a distributed ledger processing pool for processing associated with participation in the distributed ledger.

7. The method of claim 1, wherein the processing of operations associated with participation in the distributed ledger comprises performing hash operations on a block in a cryptographic blockchain.

8. A computing system, comprising:
   one or more processors; and
   one or more tangible, non-transitory computer readable media storing computer-readable instructions that are executable to cause the one or more processors to perform operations, the operations comprising:
      obtaining data describing a total computational capacity for an autonomous vehicle;
      obtaining a route for the autonomous vehicle;
      determining an amount of computational resources to be used for performing one or more driving maneuvers to be performed to navigate the route;
      determining an amount of excess computational capacity respectively for the autonomous vehicle based at least in part on map data indicating, for one or more locations, a computational complexity of navigating at the one or more locations, the amount of excess computational capacity corresponding to a processing capacity to process additional operations while navigating the route, the amount of excess computational capacity based at least in part on a difference between:
         the amount of computational resources to be used for performing the one or more driving maneuvers, and
         the total computational capacity; and
      initiating processing of the additional operations using at least a portion of the amount of excess computational capacity while navigating the route, the additional operations associated with participation in a distributed ledger.

9. The computing system of claim 8, wherein the operations further comprise:
determining a base route with an associated base route complexity for navigation by the autonomous vehicle;
determining one or more alternative routes with one or more associated alternative route complexities for navigation by the autonomous vehicle, the one or more alternative route complexities being less complex than the base route complexity;
evaluating, for each of the one or more alternative routes, a computational load difference between the alternative route and the base route based on a comparison of the alternative route complexity to the base route complexity;
determining, for each of the one or more alternative routes, an estimated gain associated with allocation of the computational load difference to processing operations associated with participation in the distributed ledger; and
selecting a route from the base route and the one or more alternative routes for navigation by the autonomous vehicle based at least in part on the respective estimated gains associated with each of the one or more alternative routes.

10. The computing system of claim 9, wherein selecting the route from the base route and the one or more alternative routes comprises:
presenting, to a user, route selection information comprising the respective estimated gain associated with each alternative route of the one or more routes; and
selecting, based on a user selection input, a route from the base route and the one or more alternative routes for navigation by the autonomous vehicle.

11. One or more tangible, non-transitory computer readable media storing computer-readable instructions that are executable to cause the one or more processors to perform operations, the operations comprising:
obtaining data describing a total computational capacity for an autonomous vehicle;
obtaining a route for the autonomous vehicle;
determining an amount of computational resources to be used for performing one or more driving maneuvers to be performed to navigate the route;
determining an amount of excess computational capacity respectively for the autonomous vehicle based at least in part on map data indicating, for one or more locations, a computational complexity of navigating at the one or more locations, the amount of excess computational capacity corresponding to a processing capacity to process additional operations while navigating the route, the amount of excess computational capacity based at least in part on a difference between:
the amount of computational resources to be used for performing the one or more driving maneuvers, and
the total computational capacity; and
initiating processing of the additional operations using at least a portion of the amount of excess computational capacity while navigating the route, the additional operations associated with participation in a distributed ledger.

12. The method of claim 1, wherein determining, by the computing system, the amount of computational resources to be used for performing the one or more driving maneuvers to be performed in the route comprises:
assessing, by the computing system and based on historical data describing historical usage of computational resources, the amount of computational resources to be used for performing one or more driving maneuvers to be performed to navigate the route.

13. The method of claim 1, wherein determining, by the computing system, the amount of computational resources to be used for performing the one or more driving maneuvers to be performed in the route comprises:
determining, by the computing system, current or forecasted traffic conditions or current or forecasted weather conditions.

14. The method of claim 1, wherein the map data provides, for a respective combination of a location and a driving maneuver, a respective computational complexity for an autonomous vehicle to execute the respective combination.

15. The method of claim 1, wherein the amount of excess computational capacity is forecasted to be available during performance of the one or more driving maneuvers.

16. The method of claim 1, wherein the processing of operations is executed during performance of the one or more driving maneuvers.

17. The system of claim 8, wherein the map data provides, for a respective combination of a location and a driving maneuver, a respective computational complexity for an autonomous vehicle to execute the respective combination.

18. The one or more tangible, non-transitory computer readable media of claim 11, wherein the map data provides, for a respective combination of a location and a driving maneuver, a respective computational complexity for an autonomous vehicle to execute the respective combination.

19. The method of claim 1, wherein the map data comprises complexity information based on current or forecasted driving conditions.

20. The method of claim 19, wherein the complexity information is based on at least one of: current or forecasted traffic conditions, or current or forecasted weather conditions.

* * * * *